US009153044B2

(12) United States Patent
Suyama et al.

(10) Patent No.: US 9,153,044 B2
(45) Date of Patent: Oct. 6, 2015

(54) IMAGE SIGNAL PROCESSING DEVICE, DISPLAY DEVICE, AND TELEVISION FOR REDUCING UNEVEN LUMINANCE IMAGE SIGNALS

(75) Inventors: Tatsuhiko Suyama, Osaka (JP); Kouji Kumada, Osaka (JP); Noriyuki Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 14/004,712

(22) PCT Filed: Mar. 14, 2012

(86) PCT No.: PCT/JP2012/056522
§ 371 (c)(1),
(2), (4) Date: Sep. 20, 2013

(87) PCT Pub. No.: WO2012/124725
PCT Pub. Date: Sep. 20, 2012

(65) Prior Publication Data
US 2014/0009484 A1 Jan. 9, 2014

(30) Foreign Application Priority Data

Mar. 15, 2011 (JP) ................................. 2011-056697

(51) Int. Cl.
*G06T 11/00* (2006.01)
*G09G 3/36* (2006.01)
*G09G 3/34* (2006.01)

(52) U.S. Cl.
CPC ............ *G06T 11/001* (2013.01); *G09G 3/3611* (2013.01); *G09G 3/3406* (2013.01); *G09G 2320/0233* (2013.01); *G09G 2320/0285* (2013.01)

(58) Field of Classification Search
CPC ...................................................... G06T 11/001
See application file for complete search history.

(56) References Cited

U.S. PATENT DOCUMENTS

| 2006/0012606 | A1* | 1/2006 | Hiraki et al. | 345/590 |
| 2007/0002000 | A1* | 1/2007 | Kwon | 345/102 |
| 2011/0234566 | A1* | 9/2011 | Asano et al. | 345/211 |

FOREIGN PATENT DOCUMENTS

| JP | 2006-030362 A | 2/2006 |
| JP | 2011-203322 A | 10/2011 |

OTHER PUBLICATIONS

Official Communication issued in International Patent Application No. PCT/JP2012/056522, mailed on Apr. 10, 2012.

*Primary Examiner* — Kee M Tung
*Assistant Examiner* — Grace Q Li
(74) *Attorney, Agent, or Firm* — Keating & Bennett, LLP

(57) ABSTRACT

A liquid crystal display device 10 according to the present invention includes a processing device 12 configured to process an image signal D to be input into a pixel P of a liquid crystal panel 40 configured to provide a display based on light applied from LEDs 54 arranged in a peripheral area R2. The process device 12 includes a receiving section 22, a correction section 24, and a calculation section 28, for example. The calculation section is configured to calculate luminance components to be provided by the respective LEDs 54 to the pixel P based on a distance between each LED 54 and the pixel P, add a total luminance that is a sum of the luminance components to be provided by the LEDs 54 to a predetermined expected luminance to calculate an added luminance, and calculate a correction coefficient HP with respect to the pixel P based on a luminance ratio between the added luminance and the reference luminance.

11 Claims, 5 Drawing Sheets

IMAGE SIGNAL PROCESSING DEVICE, DISPLAY DEVICE, AND TELEVISION FOR REDUCING UNEVEN LUMINANCE IMAGE SIGNALS

TECHNICAL FIELD

The present invention relates to an image signal processing device, a display device, a television device, an image signal processing method, and a program, in particular to a technology for providing a display on a display panel based on light applied by a light source.

BACKGROUND ART

In recent years, high-performance display devices such as a large screen television have become widely used. Some of the display devices include a light source for applying light in addition to a display panel. The light source is used to provide a display on the display panel. In such devices, an image quality is highly affected by uneven luminance that is caused in a displayed image by the light source and uneven color that is caused by properties of the display panel (hereinafter, the uneven luminance and the uneven color may be collectively referred to as "display unevenness"), and thus correction of the display unevenness is required.

For example, an optical sheet is used to reduce the uneven luminance. The optical sheet is configured to diffuse the light passing therethrough, and thus the uneven luminance is reduced by such properties. Further, as a technology for reducing the uneven color, a technology for correcting an image signal input to a pixel of the display device is known (for example, Patent Document 1). The correction of the image signal changes color that is provided by the pixel, and thus the uneven color can be reduced.

RELATED ART DOCUMENT

Patent Document

Patent Document 1: Japanese Unexamined Patent Application Publication No. 2006-30362

Problem to be Solved by the Invention

A cost of a display device is required to be lowered, and an optical sheet that is configured to improve display properties is required not to be used. In the display device that does not include the optical sheet, the uneven luminance may be reduced by correcting an image signal in the same way as the uneven color. Although the uneven luminance is caused in the display panel like the uneven color, the uneven luminance is caused by not only the properties of the display panel but also an arrangement of the light source, which is different from the uneven color. Accordingly, the uneven luminance may not be properly reduced by the known technology.

DISCLOSURE OF THE PRESENT INVENTION

The present application discloses a technology for reducing the uneven luminance in the display panel.

Means for Solving the Problem

To solve the above problem, an image signal processing device disclosed in the present application is configured to process an image signal to be input into a pixel of a display panel. The display panel is configured to provide a display based on light applied from a plurality of light sources arranged in a peripheral area. The image signal processing device includes a receiving section configured to receive the image signal, a calculation section, and a correction section. The calculation section is configured to calculate luminance components to be provided by the respective light sources to the pixel based on a distance between each of the light sources and the pixel, add a total luminance that is a sum of the luminance components to be provided by the light sources to a predetermined expected luminance to obtain an added luminance, and calculate a correction coefficient with respect to the pixel based on a luminance ratio between the added luminance and the expected luminance. The correction section is configured to correct the image signal using the correction coefficient.

In the image signal processing device, the correction coefficient that is used in the correction is calculated based on the distance between each light source and the pixel to correct the image signal and reduce the uneven luminance. Generally, the luminance component provided by each light source to the pixel depends on the distance between the light source and the pixel. Accordingly, the uneven luminance can be properly reduced by calculating the correction coefficient as above. The image signal processing device does not require an optical sheet to reduce the uneven luminance, and thus the cost of the display device including the image signal processing device can be lowered.

In the above image signal processing device, the calculation section may include light application area information relating to light application areas to which light is to be applied by the respective light sources, and if the pixel is positioned outside the light application areas of the light sources, the luminance component may be set as zero.

In the image signal processing device, the total luminance hardly include the luminance component provided by the light source that is positioned outside the light application area and does not apply the light to the pixel. Thus, the total luminance can be correctly calculated.

In the above image signal processing device, the light sources may be arranged adjacent to one side of an outer edge of the display panel. The calculation section may include a luminance component table in which distances from a reference light source arranged adjacent to the one side are associated with luminance components to be provided by the reference light source. The calculation section may be configured to determine the luminance components in the luminance component table that are associated with the distances between the light sources and the pixel as the luminance components to be provided by the light sources to the pixel.

The light sources are arranged adjacent to the one side of the display panel, and thus each light source has a similar influence on the display panel. In the image signal processing device, the reference light source is presumed as a representative of the light sources that have the similar influence, and the luminance component table is provided based on the reference light source. In the image signal processing device, the luminance component can be easily calculated, because the calculation section includes the luminance component table.

In the above image signal processing device, the light sources may be arranged adjacent to the one side of the display panel at a regular interval. The calculation section may be configured to calculate the distance between each of the light sources and the pixel based on the regular interval. In the image signal processing device, the distances between each of the light sources and the pixel can be easily calculated, because the light sources are arranged at the regular interval.

In the image signal processing device, the calculation section may include a reference luminance component at a reference distance from the reference light source. The calculation section may be configured to multiply a distance ratio between a distance from the reference light source and the reference distance by the reference luminance component to calculate the luminance component at the distance from the reference light source.

The calculation section that includes the reference luminance component at the reference distance from the reference light source can determine the luminance component of the luminance component table based on the distance ratio between the distance from the reference light source and the reference distance. Thus, the luminance component table can be easily calculated.

In the above image signal processing device, the calculation section may include a slope coefficient. The calculation section may be configured to multiply the distance ratio by the slope coefficient to obtain a multiplication result and multiply the multiplication result by the reference luminance component to calculate the luminance component at the distance from the reference light source. The calculation section that includes the slope coefficient can correctly calculate the luminance component table by multiplying the multiplication result that is obtained by multiplying the distance ratio by the slope coefficient by the reference luminance component.

In the image signal processing device, the calculation section may include a correction index that is obtained by dividing 1 by an index of a gamma function of the display panel. The calculation section may be configured to multiply the luminance ratio by the correction index to calculate the correction coefficient. When the gamma function of the display panel is known, the calculation section can easily and correctly calculate the correction coefficient by calculating the correction index by dividing 1 by the index of the gamma function.

The above image signal processing device may include a memory configured to store the correction coefficient. The image signal processing device that includes the memory is not required to calculate the correction coefficient every time a display is provided on the display panel.

In the above image signal processing device, the display panel may include a first area and a second area. The first area is adjacent to the one side and the second area is not adjacent to the one side. The pixel may be in the first area of the display panel. In the image signal processing device, the memory is only required to have a capacity necessary for the pixels in the first area, and the capacity of the memory can be reduced to the capacity corresponding to the first area.

The technology disclosed herein may be embodied as a display device that includes the above image signal processing device and a display panel configured to display based on the image signal corrected by the image signal processing device. In addition, a display device in which the display panel is a liquid crystal display panel using liquid crystals and a television device that includes the above display device have novelty and utility.

The technology disclosed herein may be embodied as a method of processing an image signal that is performed by the above image signal processing device. The image signal processing method disclosed herein is a method of processing an image signal to be input into a pixel of a display panel that is configured to provide a display based on light applied by a plurality of light sources arranged in a peripheral area. The method includes receiving the image signal, performing a first calculation step to calculate luminance components to be provided by the respective light sources based on a distance between each of the light sources and the pixel, performing a second calculation step to calculate an added luminance by adding a total luminance that is a sum of the luminance components to be provided by the light sources to a predetermined reference luminance, performing a third calculation step to calculate a correction coefficient with respect to the pixel based on a luminance ratio between the added luminance and the reference luminance, and correcting the image signal using the correction coefficient. According to the method of processing an image signal, the optical sheet is not required to be used to reduce the uneven luminance, and thus the cost of the display device that employs the image signal processing method can be lowered.

The technology disclosed herein may be embodied as a program for causing a computer to execute the above method of processing an image signal, or a recording medium containing the program.

Advantageous Effect of the Invention

According to a technology disclosed herein, the uneven luminance in the display panel can be reduced, and the cost of a display device that employs the technology can be lowered.

MODE FOR CARRYING OUT THE INVENTION

Embodiment

Figure 1:
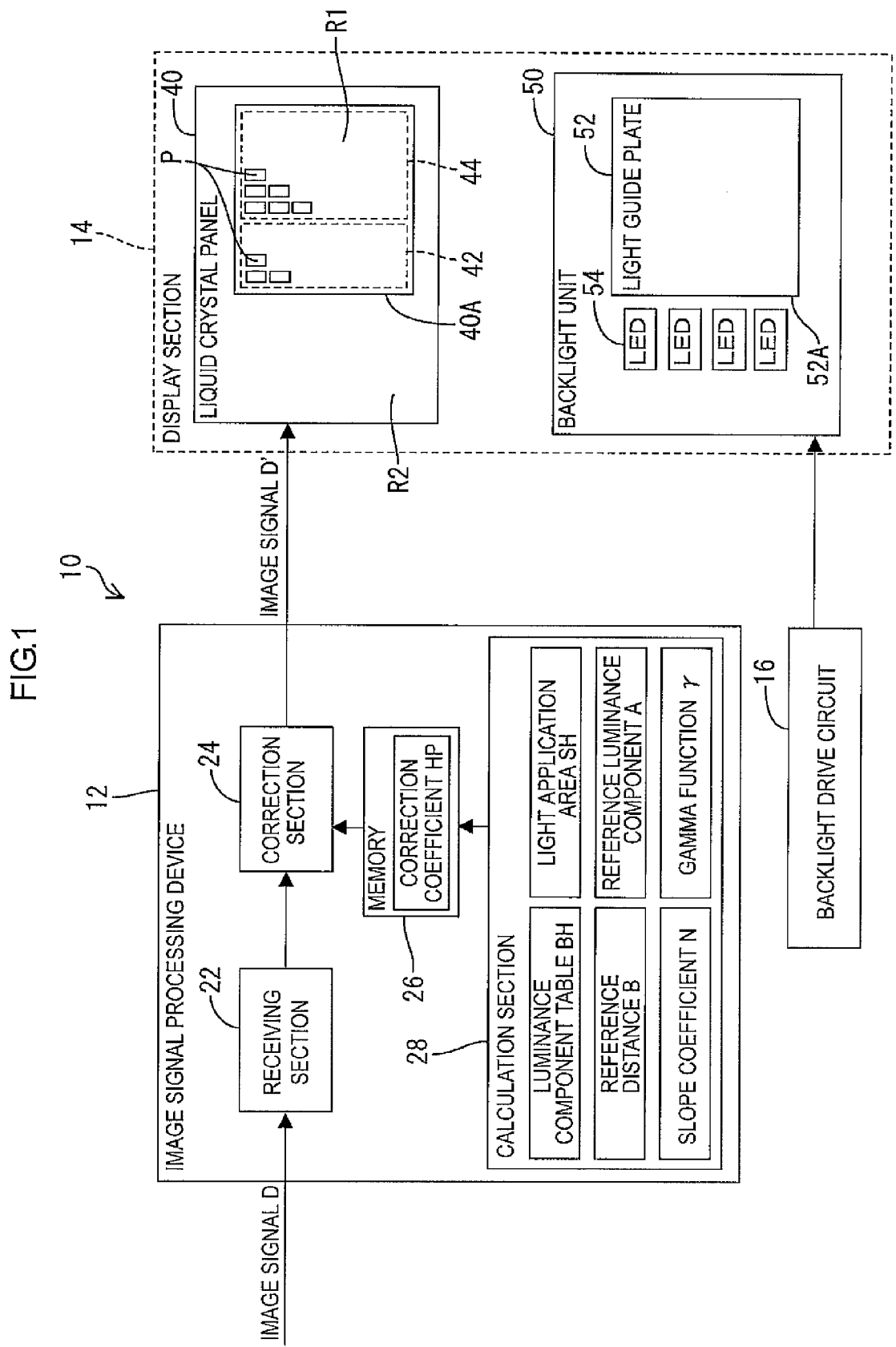
FIG. 1 is a view illustrating a configuration of a liquid crystal display device 10.

The embodiment of the present invention will be described with reference to the drawings. The following embodiment will be described using a liquid crystal display device that includes a liquid crystal panel as a display device.

1. Construction of a Liquid Crystal Display Device

The construction of a liquid crystal display device 10 will be explained with reference to FIG. 1. The liquid crystal display device 10 is a display device having a television receiving function and includes an image signal processing device (hereinafter, processing device) 12, a display section 14, and a backlight drive circuit 16. The display section 14 includes a liquid crystal panel 40 using liquid crystals (an example of a display panel) and a backlight unit 50.

Figure 3:
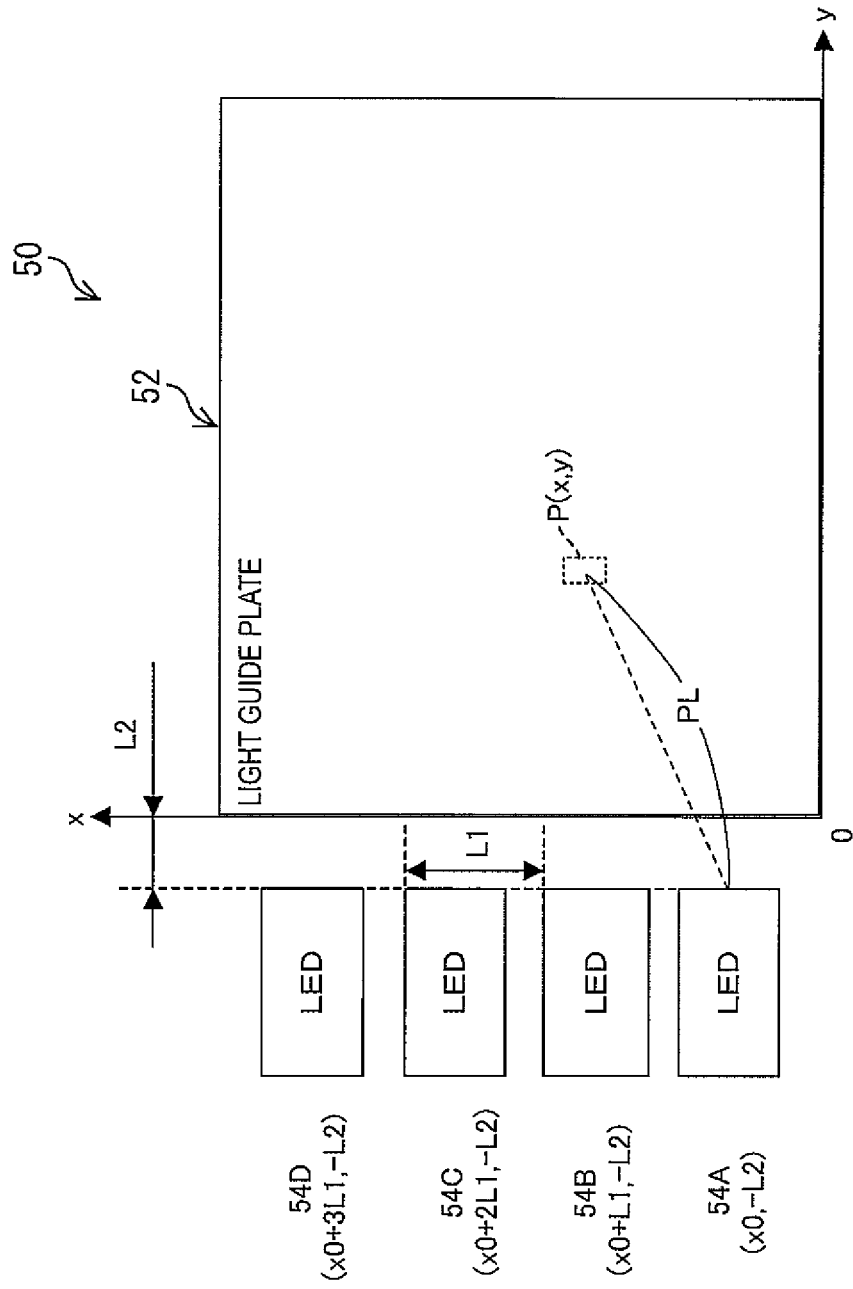
FIG. 3 is a view illustrating a configuration of a backlight unit 50.

The backlight unit 50 is arranged behind the liquid crystal panel 40. The backlight unit 50 includes LEDs 54 (Light Emitting Diode) as light sources and a light guide plate 52. As illustrated in FIG. 3, the LEDs 54 are arranged adjacent to one side 52A of the light guide plate 52. The LEDs 54 are arranged at a regular interval L1 in a direction along the one side 52A of the light guide plate 52 with a predetermined distance L2 between the one side 52A of the light guide plate 52 and each LED 54. Each of the LEDs 54 has an equal irradiation area SH (see FIG. 4).

As illustrated in FIG. 1, the liquid crystal panel 40 includes a display area R1 on which a display is provided and a peripheral area R2 around the display area. The display area R1 includes a plurality of pixels P (an example of a picture element). In the display area 14, when the liquid crystal panel 40 is arranged in front of the backlight unit 50, the display area R1 is arranged in front of the light guide plate 52 and the peripheral area R2 is arranged in front of the LEDs 54. That is, the LEDs 54 are arranged corresponding to the peripheral area R2.

In the display area R1, the one side 40A of the display area R1 is defined so as to correspond to the one side 52A of the light guide plate 52. Accordingly, in the display section 14, the LEDs 54 are arranged adjacent to the one side 40A of the display area R1. Thus, the display area R1 can be divided into a first area 42 that extends from the one side 40A and a second area 44 that is a remaining area of the display area R1. Here, "divide" refers not only a state in which the display area R1 is physically divided, but also a state in which the display area R1 of the liquid crystal panel 40 is formally divided. Each of the first area 42 and the second area 44 includes the pixels P.

The backlight drive circuit 16 is connected to the LEDs 54 included in the backlight unit 50. The backlight drive circuit 16 supplies current to each of the LEDs 54 and controls the amount of current to be supplied to the LEDs 54 such that the equal amount of light is entered into the light guide plate 52 from each of the LEDs 54.

The processing device 12 is configured to correct the image signal D that is a gray scale data supplied from an external device (not illustrated) and supply the corrected image signal data D' to the display area R1 of the liquid crystal panel 40. The image signal D includes an image single D1 to be supplied to the first area 42 and an image signal D2 to be supplied to the second area 44. The processing device 12 is configured to correct the image signal D1 and supply the image signal D1' to the first area 42 to provide a display on the first area 42. Further, the processing device 12 is configured to supply the image signal D2 to the second area 44 without correcting the image signal D2 to provide a display on the second area 44.

The processing device 12 includes a receiving section 22, a correction section 24, a memory 26, and a calculation section 28.

The receiving section 22 is configured to receive the image signal D from the external device. The correction section 24 is configured to correct the image signal D1 of the image signal D that is received by the receiving section 22. The memory 26 stores a correction coefficient HP that is used in the correction process. The correction section 24 is configured to read out the correction coefficient HP from the memory 26 to correct the image signal D1. As will be described later, the calculation section 28 stores various kinds of information relating to the backlight unit 50 or the liquid crystal panel 40 such as information relating to positions of the LEDs 54 of the backlight unit 50 or a gamma function of the liquid crystal panel 40. The calculation section 28 is configured to calculate the correction coefficient HP based on such information, and then store the calculated correction coefficient HP in the memory 26.

2. Correction Coefficient Calculation Process

The calculation section 28 of the liquid crystal display device 10 calculates the correction coefficient HP before the image signal D is received and the display is provided on the display section 14. The correction coefficient HP is largely affected by the configuration of the backlight unit 50, particularly the arrangement of the LEDs 54 in relation to the light guide plate 52. In the present embodiment, the LEDs 54 are arranged adjacent to the one side 52A of the light guide plate 52 at a regular interval L1, and thus efficiency of the calculation of the correction coefficient HP is improved.

Figure 2:
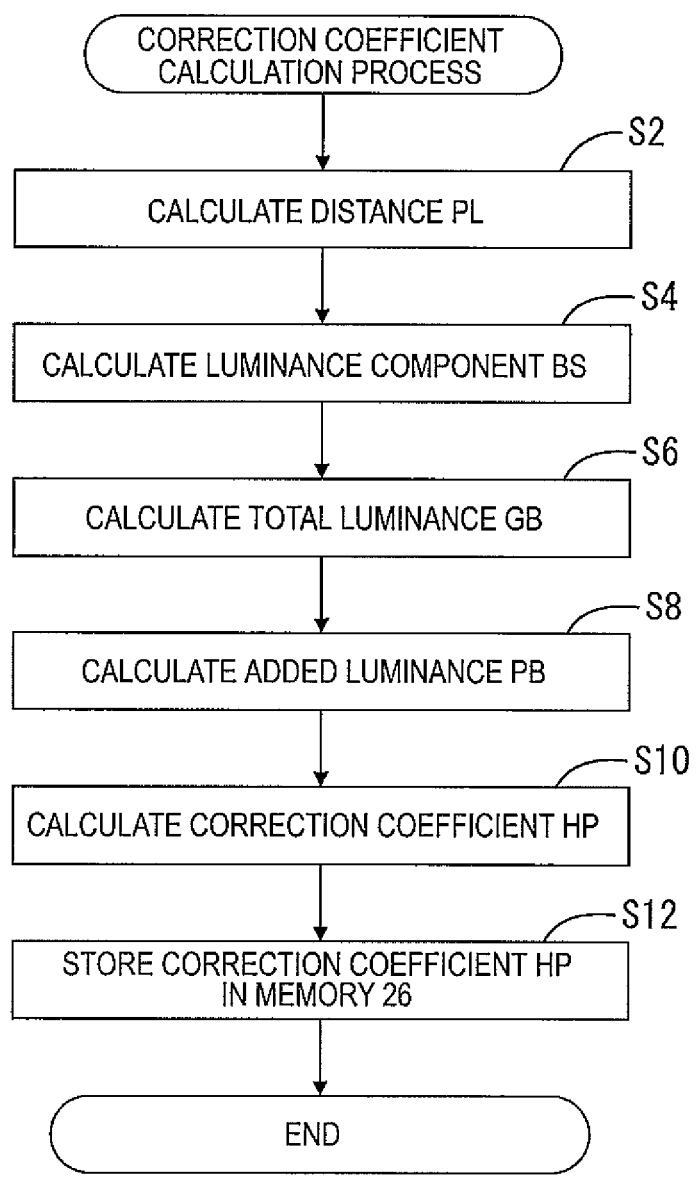
FIG. 2 is a flow diagram indicating a correction coefficient calculation process.

The calculation process is explained with reference to FIG. 2.

The calculation section 28 calculates a distance PL between the pixel P included in the first area 42 and each of the LEDs 54 at the start of the calculation process (S2). As illustrated in FIG. 3, the one side 52A of the light guide plate 52 corresponds to an x-axis and a side extending perpendicular to the one side 52A of the light guide plate 52 corresponds to a y-axis. A coordinate of the pixel P is indicated as (x, y) and a coordinate of the LED 54A is indicated as (x0, −L2) by using a predetermined distance L2. A distance PLA is indicated as below.

$$PLA=\sqrt{((x-x0)^2+(y+L2)^2)}$$

The LEDs 54 are arranged in the x-axis direction at the regular interval L1. Accordingly, coordinates of the other LEDs 54 are indicated by (x0+(M−1)×L, −L2)(M=2, 3, 4) by using the regular interval L1. A distance PLM is indicated as below. In the present invention, the coordinates of the other LEDs 54 can be determined when the coordinate of any one of the LEDs 54 is determined, because the LEDs 54 are arranged at the regular interval L1 at the side adjacent to the one side 52A of the light guide plate 52. Efficiency of the calculation process of the distance PL between the pixel P and each of the LEDs 54 is improved.

$$PLA=\sqrt{((x-x0)-(M-1)\times L)^2+(y+L2)^2)}$$

Next, the calculation section 28 calculates a luminance component BS provided by each LED 54 to the pixel P (S4). The calculation section 28 stores various kinds of information relating to the backlight unit 50. In the luminance component calculation process, the information is used to calculate the luminance component BS.

Figure 4:
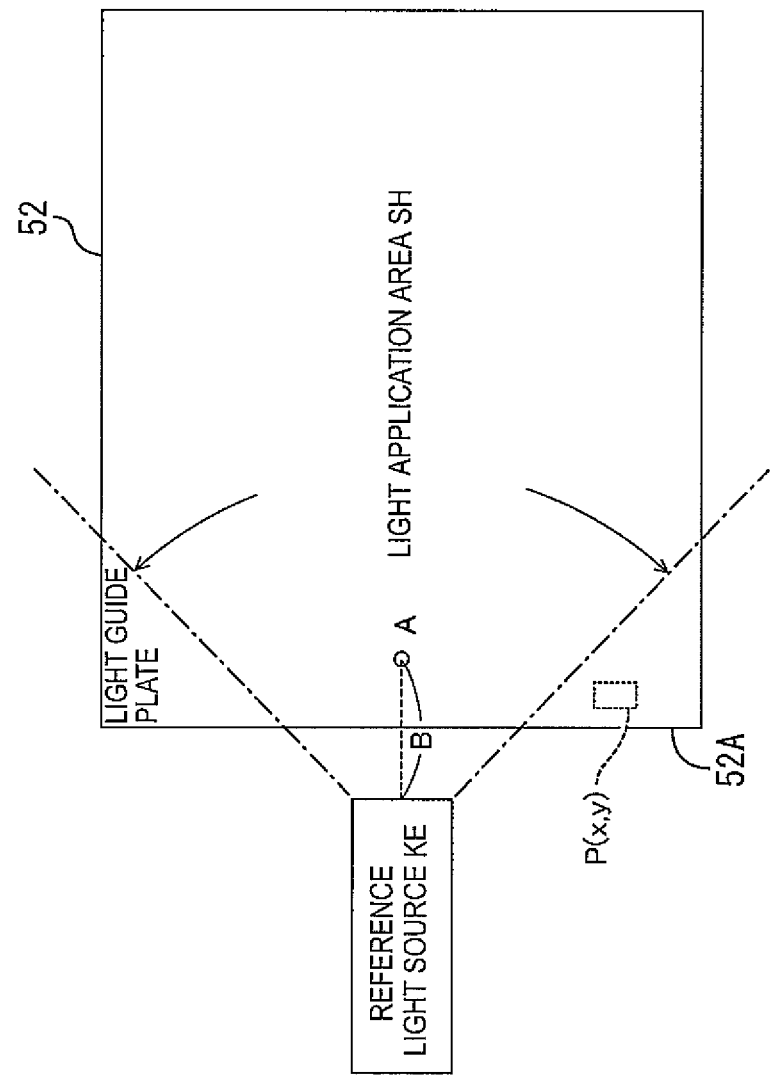
FIG. 4 is a view illustrating a light application area SH of an LED 54.

The calculation section 28 stores information relating to the amount of light to be applied to the light guide plate 52 by the LED 54 of the backlight unit 50. In the calculation section 28, a luminance component table BH for a reference light source KE is calculated based on the information. Here, as illustrated in FIG. 4, the reference light source KE is a light source that is arranged on the side adjacent to the one side 52A of the light guide plate 52 like the LEDs 54 and is configured to apply light to the light guide plate 52 in the amount equal to the LEDs 54. The reference light source KE has light incident characteristics common in the LEDs 54. The luminance components BS to be provided by each of the LEDs 54 to the pixel P is obtained by arranging the reference light source KE at the positions of LEDs 54. The reference light source KE has a light application area SH that is equal to that of each LED 54.

The luminance component table BH includes the luminance components BS each to be provided by the reference light source KE to the pixel P that is positioned at any one of distances L from the reference light source KE. In the luminance component table BH, the luminance components BS are associated with the distances L. In the calculation section 28, a reference luminance component A of the pixel P that is away from the reference light source KE by a reference distance B is set based on the information relating to the backlight unit 50. Generally, the light emitted from the light source is diffused as it travels, and thus the distance from the light source is in inverse proportion to the luminance component. In the calculation section 28, a slope coefficient N that indicates a degree of diffusion of the light amount is set based on the information relating to the backlight unit 50. The calculation section 28 calculates a distance ratio of the distance L to the reference distance B and determines the luminance component BS at the distance L based on the reference luminance component A and the slope coefficient N.

$$BS = A \times (B/L)^N$$

In the calculation of the luminance component BS, the calculation section 28 selects the luminance component BS that is associated with the distance PL between the pixel P and each LED 54 from the luminance component table BH and determines the luminance component BS as the luminance component BS to be provided by each LED 54 to the pixel P. As illustrated in FIG. 4, when the pixel P is not in the light application area SH of each LED 54, the calculation section 28 substitutes an infinite ∞ as the distance PL so that the luminance component BS becomes zero.

$$BS = A \times (B/PL)^N$$

Next, the calculation section 28 sums up the luminance components BS provided by each of the LEDs 54 to the pixel P to calculate the total luminance (S6). In the calculation section 28, an expected luminance MB is set based on an expected value of white luminance required for the liquid crystal panel 40. The calculation section 28 calculates an added luminance PB by adding the total luminance GB to the expected luminance MB (S8).

$$PB = A \times \Sigma (B/PLi)^N + MB$$

Figure 5:
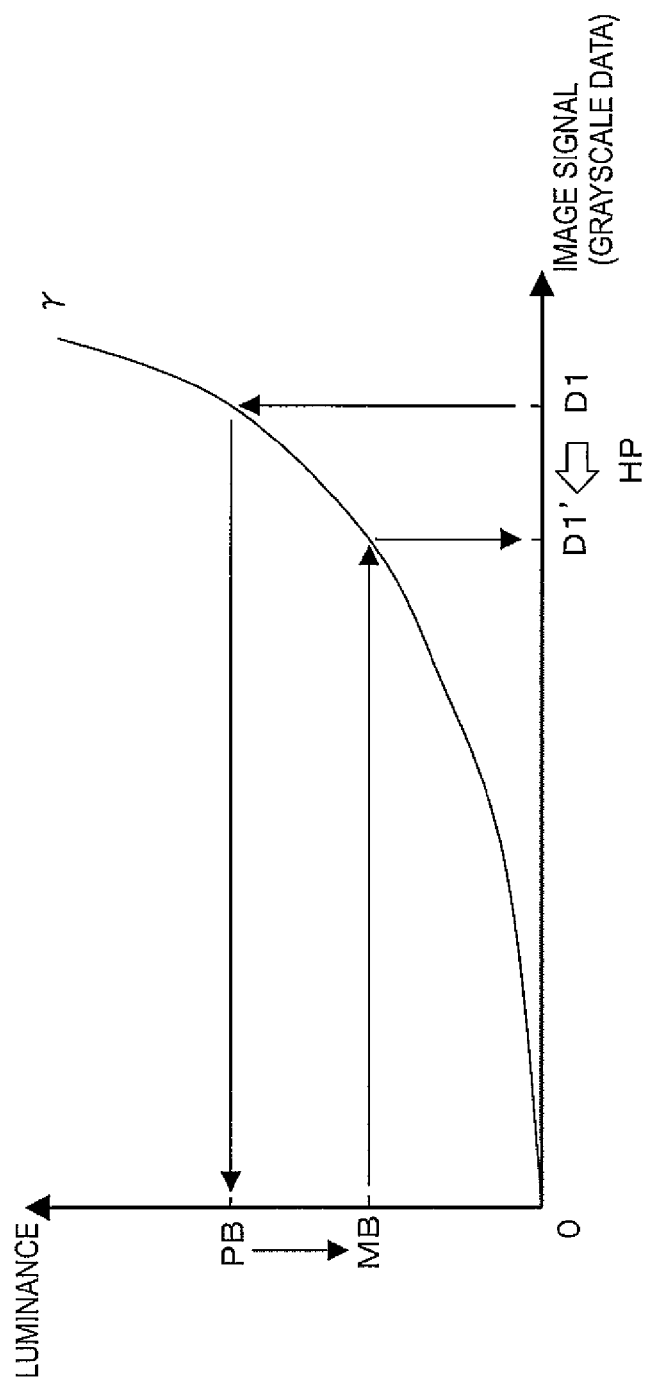
FIG. 5 is a view illustrating a gamma function of a liquid crystal panel 40.

Next, the calculation section 28 calculates the correction coefficient HP (S10). As illustrated in FIG. 5, the calculation section 28 stores an index γ of the gamma function set for the liquid crystal panel 40. The calculation section 28 calculates the correction index c that is obtained by dividing 1 by the index γ. The calculation section 28 calculates a luminance ratio of the expected luminance MB to the added luminance PB, and calculates the correction coefficient HP of the pixel P based on the correction index c as below.

$$HP = (MB/PB)^c = \sqrt[\gamma]{(MB/PB)}$$

The calculation section 28 associates the calculated correction coefficient HP with the pixel P and stores it in the memory 26 (S12), and terminates the correction coefficient processing process.

As illustrated in FIG. 5, when the image signal D1 is input to the pixel P in the first area 42, the correction section 24 reads out the correction coefficient HP that is associated with the pixel P and stored in the memory 26. The image signal D1 is corrected using the correction coefficient HP to calculate the image signal D1'.

$$D1' = D1 \times HP$$

3. Characteristics of Correction Coefficient Calculation Process (1) In the backlight unit 50, the LEDs 54 are arranged adjacent to the one side 52A of the light guide plate 52. This allows wiring for supplying electricity to the LEDs 54 to have a shorter length. Thus, the production cost of the liquid crystal display device 10 can be reduced. However, since the LEDs 54 are arranged close to each other, portions corresponding to the areas between the LEDs 54 may be brighter than portions corresponding to the LEDs 54. Such arrangement may cause the uneven luminance in which the luminance to be provided by each LED 54 to the pixel P varies according to the positions of the LEDs 54 in the liquid crystal panel 40.

Generally, the luminance component to be provided by each LED 54 to the pixel P depends on the distance between each LED 54 and the pixel P. The processing device 12 of the present embodiment uses this characteristic to calculate a correction coefficient HP that corrects the image signal D1 input to the liquid crystal panel 40 based on the distance PL between the pixel P and each LED 54. With this configuration, even if the uneven luminance occurs in the backlight unit 50, the uneven luminance is less likely to occur over the display section 14 due to the correction coefficient HP that is determined so as to eliminate the uneven luminance. Thus, the display properties provided by the display section 14 are less likely to be deteriorated.

The processing device 12 of the present embodiment does not require an optical sheet to reduce the uneven luminance caused in the backlight unit 50. Accordingly, the production cost of the liquid crystal display device 10 can be reduced. In addition, a yield rate of the backlight unit 50 can be improved, and the production cost can be further reduced.

(2) In the processing device 12 of the present embodiment, if the pixel P is not in the light application area SH of each LED 54, in the calculation of the luminance component BS to be provided by each LED 54 to the pixel P, the distance PL is set as infinite ∞ such that the luminance component BS becomes zero. Accordingly, the luminance component BS of the LED 54 that does not apply light to the pixel P is not added to the total luminance GB. Thus, the total luminance GB can be correctly calculated.

(3) In the processing device 12 of the present embodiment, the LEDs 54 are arranged adjacent to the one side 52A of the light guide plate 52 and the amount of light applied from each LED 54 to the liquid crystal panel 40, the interval between the LEDs 54, and the light application area SH of each LED 54 are each set to be equal. Accordingly, the reference light source KE having the light incident characteristics that is common in the LEDs 54 can be presumed. The luminance component table BH can be calculated based on the reference light source KE. In the processing device 12 of the present embodiment, due to the luminance component table BH that is calculated in advance, the luminance component BS can be efficiently calculated.

Further, the distances PL between each LED 54 and the pixel P can be efficiently calculated, because the LEDs 54 are arranged adjacent to the one side 52A of the light guide plate 52 at the regular interval L1. The luminance component BS can be further efficiently calculated.

(4) In the processing device 12 of the present embodiment, the calculation section 28 includes various kinds of information relating to the backlight unit 50 or the liquid crystal panel 40. Based on such information, the reference luminance component A, the reference distance B, the slope coefficient N, and the correction index c are set and calculated. In the processing device 12 of the present embodiment, by using such information, the luminance component table BH can be efficiently calculated and the correction coefficient HP can be efficiently calculated from the luminance component BS that is calculated using the luminance component table BH.

(5) In the processing device 12 of the present embodiment, the correction coefficient HP is calculated by the calculation section 28 before the image signal D is input to the liquid crystal panel 40, and the calculated correction coefficient HP is stored in the memory 26. Accordingly, the calculation of the correction coefficient HP is not required every time a display is provided on the liquid crystal panel 40. This reduces burden on the processing device 12.

Further, in the processing device 12 of the present embodiment, the correction coefficient HP is not calculated for every pixels P in the entire area of the display area R1 of the liquid crystal panel 40, but for the pixels P that are arranged adjacent to the side 52A of the light guide plate 52, i.e., the one side 40A of the first area 42 of the display area R1. The first area 42 is highly affected by dark portions where the LEDs 54 are arranged and bright portions that are positioned between the LEDs 54. In the processing device 12 of the present embodiment, the memory 26 is only required to have a capacity that corresponds to the pixels P included in the first area 42. The capacity of the memory 26 can be reduced to the capacity that corresponds to the first area 42.

The first area 42 extends from the one side 40A of the display area R1 to a substantially halfway point of a side perpendicular to the one side 40A, preferably to a one-quarter point of the side.

Other Embodiments

The present invention is not limited to the above embodiments described in the above description and the drawings. The following embodiment is also included in the technical scope of the present invention, for example.

(1) In the above embodiment, the expected luminance MB is set based on the expected value of the white luminance required for the liquid crystal panel 40. In addition, for example, the expected luminance MB may be set based on a screen that has a dither pattern set in advance. Similarly, a screen having a blur pattern may be set in advance. The user is less likely to recognize the uneven luminance even if the user monitors the liquid crystal panel 40 on which a display is provided by the corrected image signal D1', because the screen has such a pattern.

(2) In the above embodiment, the distance PL is calculated for each pixel P in the first area 42 of the liquid crystal panel 40 and the luminance component BS is calculated for each pixel P to calculate the correction coefficient HP. However, the present invention is not limited thereto. For example, when the luminance components $BS_{m,n}$ are calculated for the pixels $P_{m,n}$, an average of luminance components $BS_{m-1,n-1}$ or $PL_{m+1,n+1}$ of the pixels $P_{m-1,n-1}$ adjacent thereto or pixels $P_{m+1,n+1}$ adjacent thereto may be calculated to obtain the luminance components $BS_{m,n}$ of the pixel P as indicated below. The alphabet "m" or "n" indicates an arrangement of the pixel P in the display area R1 of the liquid crystal panel 40.

$$BS_{m,n} = \text{Average}(BS_{m-1,n-1}, \ldots, BS_{m+1,n+1})$$

(3) In the above embodiment, when the correction coefficient HP is calculated for the pixel P in the first area 42 of the liquid crystal panel 40, a parameter such as the luminance component table BH or the light application area SH is used to calculate the correction coefficient HP. Although the parameter is preferably determined for each liquid crystal display device 10, common values may be used for a parameter that is less likely to vary depending on the liquid crystal display devices 10.

(4) In the above embodiment, the LED is used as a light source. However, a light source other than the LED may be used. Further, the above embodiment includes four LEDs. However, the number of LEDs may be changed according to the size of the liquid crystal panel 40 or required luminance.

(5) In the above embodiment, the liquid crystal device 10 is used as a device configured to correct the image signal D. However, the device configured to correct the image signal D is not limited thereto. For example, if a program in the above liquid crystal display device 10 can be used separately from the liquid crystal display device 10, a PC that has the program can correct the image signal D like the liquid crystal display device 10 of the present embodiment. Thus, the advantages of the present invention can be obtained.

EXPLANATION OF SYMBOLS

10: liquid crystal display device, 12: image signal processing device, 14: display section, 22: receiving section, 24: correction section, 26: memory, 28: calculation section, 40: liquid crystal panel, 42: first area, 44: second area, 50: backlight unit, 52: light guide plate, 54: LED, A: reference luminance component, B: reference distance, BH: luminance component table, BS: luminance component, c: correction index, HP: correction coefficient, KE: reference light source, MB: expected luminance, N: slope coefficient, P: pixel, PB: added luminance, R1: display area, R2: peripheral area, SH: light application area, γ: index of gamma function

The invention claimed is:

1. An image signal processing device configured to process an image signal to be input into a pixel of a display panel, the display panel being configured to provide a display based on light applied from a plurality of light sources arranged in a peripheral area, the image signal processing device comprising:
   a receiving section configured to receive the image signal;
   a calculation section configured to:
      calculate luminance components to be provided by the respective light sources to the pixel based on a distance between each of the light sources and the pixel;
      add a total luminance that is a sum of the luminance components to be provided by the light sources to a predetermined expected luminance to obtain an added luminance; and
      calculate a correction coefficient with respect to the pixel based on a luminance ratio between the added luminance and the expected luminance; and
   a correction section configured to correct the image signal using the correction coefficient, wherein
   the light sources are arranged adjacent to one side of an outer edge of the display panel,
   the calculation section includes a luminance component table in which distances from a reference light source arranged adjacent to the one side are associated with luminance components to be provided by the reference light source, and
   the calculation section is configured to determine the luminance components in the luminance component table that are associated with the distances between the light sources and the pixel as the luminance components to be provided by the light sources to the pixel.

2. The image signal processing device according to claim 1, wherein
   the calculation section includes light application area information relating to light application areas to which light is to be applied by the respective light sources, and
   if the pixel is positioned outside the light application areas of the light sources, the luminance component is set as zero.

3. The image signal processing device according to claim 1, wherein
   the light sources are arranged adjacent to the one side of the display panel at a regular interval, and
   the calculation section is configured to calculate the distance between each of the light sources and the pixel based on the regular interval.

4. The image signal processing device according to claim 1, wherein
   the calculation section includes a reference luminance component at a reference distance from the reference light source, and
   the calculation section is configured to multiply a distance ratio between a distance from the reference light source and the reference distance by the reference luminance component to calculate the luminance component at the distance from the reference light source.

5. The image signal processing device according to claim 4, wherein
the calculation section includes a slope coefficient, and
the calculation section is configured to multiply the distance ratio by the slope coefficient to obtain a multiplication result and multiply the multiplication result by the reference luminance component to calculate the luminance component at the distance from the reference light source.

6. The image signal processing device according to claim 1, wherein
the calculation section includes a correction index that is obtained by dividing 1 by an index of a gamma function of the display panel, and
the calculation section is configured to multiply the luminance ratio by the correction index to calculate the correction coefficient.

7. The image signal processing device according to claim 1, further comprising a memory configured to store the correction coefficient.

8. The image signal processing device according to claim 7, wherein
the display panel includes a first area and a second area, the first area being adjacent to the one side and the second area being not adjacent to the one side, and
the pixel is in the first area of the display panel.

9. A display device comprising:
the image signal processing device according to claim 1; and
a display panel configured to display based on the image signal corrected by the image signal processing device.

10. The display device according to claim 9, wherein the display panel is a liquid crystal display panel using liquid crystals.

11. A television device comprising the display device according to claim 9.

* * * * *